March 4, 1958  H. W. SCHEELINE ET AL  2,825,746
EXTRACT STRIPPING PROCESS FOR DIISOPROPYL ETHER MANUFACTURE
Filed Jan. 31, 1956
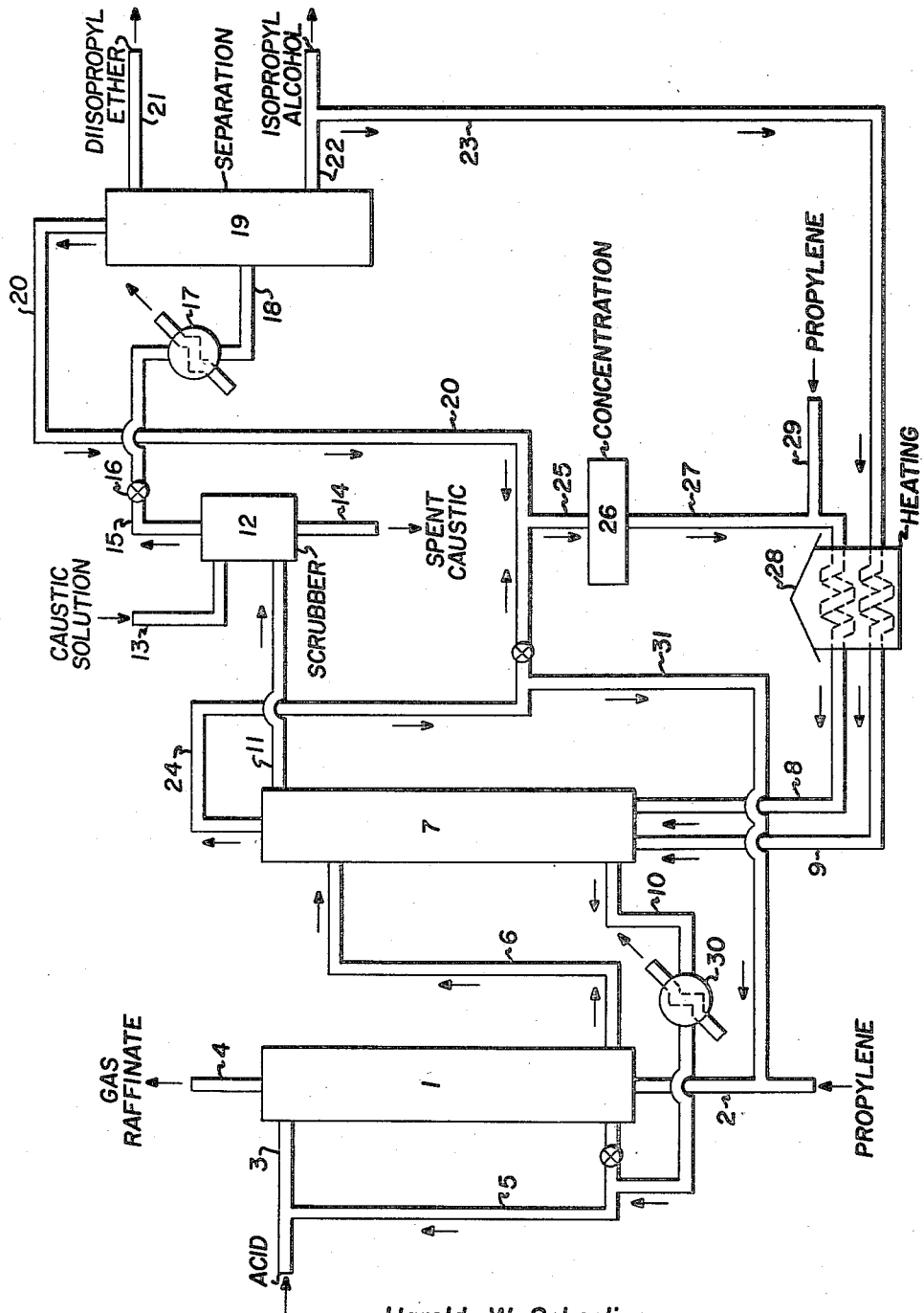
Harold W. Scheeline
Addison W. Hubbard   Inventors
Thomas H. Hakala
By *Henry Berk* Attorney

United States Patent Office 2,825,746
Patented Mar. 4, 1958

2,825,746

EXTRACT STRIPPING PROCESS FOR DIISO-PROPYL ETHER MANUFACTURE

Harold W. Scheeline, Elizabeth, Addison W. Hubbard, Westfield, and Thomas H. Hakala, Union, N. J., assignors to Esso Research and Engineering Company, a corporation of Delaware Application January 31, 1956, Serial No. 562,402

3 Claims. (Cl. 260—614)

This invention relates to an improved process for the manufacture of diisopropyl ether. It is more specifically concerned with an improved extract stripping process wherein an acid extract containing dissolved propylene is heated in an ether generation zone to recover propylene hydration products, primarily diisopropyl ether.

According to this invention, the generation of the ether is carried out at superatmospheric pressures whereby propylene regeneration is suppressed, and the acid extract is stripped with heated recycled propylene gas whereby ether yields are substantially increased. By heating the recycled propylene gas, the acid extract is conveniently heated without resorting to the use of heating surfaces in contact with the acid extract in the generation zone.

This invention proposes an improved extract stripping process wherein a sulfuric acid extract containing about 1.0 to 1.6 moles of dissolved propylene per mole of 100% sulfuric acid is heated in an ether generation zone to a temperature in the range of 90° to 120° C. to distill ether therefrom, and wherein normally there is a large amount of propylene regenerated and distilled during the heating. The improvement comprises maintaining the ether generation zone at a pressure in the range of 25 to 250 p. s. i. g., while stripping the acid extract therein with heated recycled propylene gas containing preferably over 90 mole percent of propylene in an amount in the range of 5 to 20 moles of propylene per mole of ether distilled. The recycled propylene gas is heated to a temperature in the range of 100 to 275° C. to heat the acid extract. This removes the necessity for supplying heat through metallic heat transfer surfaces in the acid phase within the ether generator. Plant investment is consequently reduced quite substantially. Through the use of pressure and of propylene stripping gas, propylene regeneration is materially suppressed and increased ether yields and selectivities are obtained.

Among other uses, it has been found that diisopropyl ether because of its high octane blending value, is useful as an additive to motor gasolines. It also finds use as a solvent and as a chemical raw material.

One method used in the past to produce diisopropyl ether is the acid extract stripping process. In this process a propylene rich gas is passed through sulfuric acid maintained at a strength of about 60 to 70 wt. percent on a hydrocarbon free basis, to form an acid extract containing about 0.8 to 1.6 moles of dissolved propylene per mole of 100% acid. A conventional absorption tower is used to form the acid extract. The tower may comprise, for example, a bubble cap tower, packed tower, or one or more reaction vessels wherein contact between the vapor and the acid is positively carried out by mechanical means.

The acid extract so obtained is then partially stripped in ether generation zone to recover hydration products. The products normally comprise diisopropyl ether and isopropyl alcohol along with a considerable amount of regenerated propylene. The lean acid extract remaining after stripping is recycled to the absorption tower to be refortified with propylene. It is also customary to recycle the alcohol recovered from the hydration products to the ether generation done to maximize ether yields.

This acid extract stripping process, wherein the acid extract is not diluted, results in large savings in plant investment because corrosive weak acid is not handled anywhere in the system. It suffers from some disadvantages, however, in that ether yields are not as good as they might be and a large amount of propylene is regenerated, which if recycled, results in a considerable investment in compressor equipment.

The present invention proposes improvements in the acid extract stripping process whereby these and other disadvantages are overcome. It has now been found that when the ether generation zone is operated under superatmospheric pressure, ether generation is not detrimentally suppressed with respect to propylene regeneration, as might be expected. The pressure favorably suppresses propylene regeneration while not materially affecting ether regeneration, whereby maximum yields of ether can be obtained. The use of pressure synergistically combined with stripping of the acid extract with a propylene rich gas, results in maximum yields, heretofore unobtainable by the use of either feature alone.

The following description of the drawing attached to and forming a part of this specification will serve to make this invention clear. While a method of forming an acid extract is illustrated in the drawing, the preparation of an acid extract forms no part of this invention and may be accomplished by any of several well-known processes.

To form an acid extract, a propylene containing gas is admitted to the base of conventional absorption tower 1 by line 2, and passes upwardly therethrough countercurrent to descending sulfuric acid supplied by line 3. A gas raffinate is removed overhead from the tower by line 4 and may be disposed of as desired. It is convenient in some cases to reconcentrate this gas raffinate and recycle it to the absorption tower. To promote contacting in the tower, a portion of the acid extract can be withdrawn from the base of the tower by line 5 and recycled to the acid inlet.

The acid extract formed in the absorption tower is withdrawn by line 6 and transferred to an ether generation zone 7. The ether generation zone may be of any conventional type that promotes effective countercurrent contact between the stripping gas and the acid extract. For example, it may comprise a packed tower or a bubble cap tower. It is preferred to have this zone constructed of a material possessing a smooth surface, e. g. porcelain or ceramic, whereby propylene regeneration by nucleation in the acid extract is repressed.

As previously indicated, heated recycled propylene gas is supplied to the base of the generation zone 7 by line 8, to effect stripping and heating of the acid extract. To increase ether yields, the isopropyl alcohol recovered from the hydration products, which may be in water solution, can also be heated and recycled to the base of the tower by line 9. It will be appreciated that by heating the recycled propylene and alcohol streams, the necessity of having heating surfaces in contact with the strong acid extract is avoided.

The stripping gas passes up through ether generation zone 7 countercurrent to downflowing acid extract, at a rate in the preferred range of 0.5 to 3.0 moles/mole of propylene as extract feed, thereby driving off the ether along with some alcohol, water and regenerated propylene. The stripping gas and regenerated propylene is recovered overhead by line 24. The ether generation zone is maintained at a preferred temperature range of 100° to 115° C. and at a pressure in the range of 25 to 250 p. s. i. g., whereby propylene regeneration is substantially suppressed while ether generation is not detrimentally affected.

Lean acid extract, having been stripped, is recycled from the ether generator to the absorption zone via line 10. The lean acid extract may be cooled if necessary in heat exchanger 30. This lean acid extract preferably contains less than 1.0 mole of dissolved propylene per mole of 100% $H_2SO_4$. To maintain the water balance in the system and the preferred acid strength of 60 to 70 wt. percent, on a hydrocarbon free basis, water may be added to the lean acid extract or to the acid extract in line 6. As shown, however, the necessary make-up water is supplied in this example with the recycled alcohol in line 9.

The hydration products are removed from the ether generation zone by line 11 and sent to a separation system which may be of any conventional type. The hydration products may be reduced in pressure at this point, at some point during the separation, or the ether may be condensed and recovered without reducing the pressure. This later method of operation will, of course, save on propylene compression costs. One method of separation may comprise, for example, first scrubbing the hydration products with caustic in a scrubbing zone 12 with caustic solution being supplied by line 13 and spent caustic being removed by line 14. The scrubbed hydration products are then removed by line 15, reduced in pressure by valve 16, cooled in heat exchanger 17, and passed by line 18 to a separation zone, e. g., a distillation tower 19.

A propylene containing gas is recovered overhead from zone 19, via line 20. The desired diisopropyl ether is removed from the upper portion of the zone by line 21 as product and may be further treated as desired. Isopropyl alcohol is recovered lower down in the zone via line 22 and may be removed as product but is preferably returned by line 23 to the generation zone, as previously explanied.

According to this invention, the propylene gas evolved during ether generation and recovered by line 24, and the propylene gas in line 20 from the separation zone, are combined and passed by line 25 to a concentration zone 26 and thence recycled to the ether generation zone. Any convenient means of concentrating the propylene in the gas may be used such as fractionation. The concentrated gas is passed by line 27 through a heating zone or furnace 28, and thence by line 8 to the generator. The alcohol in line 23 may also be passed through heating zone 28 or another heating zone and reheated to a temperature in the range of 90° to 125° C. or higher, before being passed by line 9 to zone 7.

In an alternative embodiment of this invention, fresh propylene feed, instead of being first passed to the absorption zone, may first be passed through the ether generation zone and then passed to the absorption zone. This reduces the amount of concentration equipment needed and provides a higher propylene partial pressure in the ether generation zone. Thus, a propylene gas containing over 95 vol. percent of propylene is admitted to heating zone 28 via line 29 and the regenerated propylene in line 24 is passed by line 31 to line 2 and thence to absorber 1.

The following data in Table I show the effect of pressure and stripping. The data were obtained by heating an acid extract in a stirred pressure reactor. The acid extract had a strength of 67 wt. percent on a hydrocarbon free basis and contained 1.5 moles of propylene/mole of 100% $H_2SO_4$. When stripping was used, the extract was stripped with about 12.5 moles of propylene gas/mole of propylene recovered as ether product. The propylene stripping gas contained over 99 vol. percent of propylene. The acid extract was stripped with this amount of gas for 30 minutes.

Table I

| Pressure, p. s. i. g. | 45 | | 20 | | 0 | |
|---|---|---|---|---|---|---|
| Stripping | Yes | No | Yes | No | Yes | No |
| Ether Selectivity | 18.4 | 9.5 | 6 | 6.5 | 2.5 | 4 |

Table I shows that as the pressure increases, ether selectivity (moles of propylene converted to ether per mole of propylene converted to ether, alcohol, polymer and regenerated propylene) is substantially increased. The table also shows that when stripping is used, ether selectivity is increased only at higher pressures. The table further shows that when both relatively high pressures and stripping gas are used, the combined effect is greater than the single effect of using either stripping gas or pressure.

The following examples in Table II illustrate the economic advantage of the process of this invention over prior art methods. When operating according to this invention (Examples C and D) with recycle of propylene and heating of the recycled propylene to supply heat to the generator, a significant improvement is obtained over the use of a conventional reboiler system to supply heat, with propylene recycle (Example B), or the use of a reboiler with alcohol recycle only (Example A). Note that because the recycled propylene is used as a heating means in Examples C and D the investment in the ether generator is significantly reduced. The total investments for the processes of C and D are also considerably lower than for the processes of A and B. From studies, it appears that there is no advantage to be gained by operating at pressures above about 250 p. s. i. g.

Table II

Production Level—45 MM Gals./Year Ether.
Feed—8030 B./S. D. (53.2 Mole Percent $C_3H_6$).
Service Factor—90%.

| | A | B | C | D |
|---|---|---|---|---|
| Recycle Stream | Alcohol | Propylene | | |
| Recycle Rate, Moles/Mole Ether Product | 1.6 | 3.1 | 10 | 47 |
| Recycle Stream Temperature, °F | 700 | 700 | 470 | 290 |
| Ether/$C_3H_6$ Selectivity Ratio | 1.0 | 1.67 | 3.0 | 3.0 |
| Ether Generator Conditions: | | | | |
| Temperature, °F | 230 | 220 | 230 | 230 |
| Pressure, p. s. i. g. | 5 | 5 | 50 | 235 |
| Acid Concentration, Wt. Percent | 67 | 67 | 67 | 67 |
| Heating Method | Reboiler | | Heat Recycle Stream | |
| Extract Saturations, Moles $C_3H_6$/Mole $H_2SO_4$: | | | | |
| To Ether Generator (Incl. Alcohol Recycle) | 1.4 | 1.4 | 1.4 | 1.4 |
| Recycle to Absorber | 0.6 | 0.6 | 0.6 | 0.6 |
| Conversions, Percent: | | | | |
| Total | 60 | 60 | 60 | 60 |
| To Ether | 24 | 30 | 36 | 36 |
| On Site Investments, $ MM: | | | | |
| Propylene Absorbers | 1.08 | 0.97 | 0.90 | 0.90 |
| Ether Generator | 1.22 | 0.94 | 0.40 | 0.40 |
| Vapor Condenser | 0.09 | 0.10 | 0.05 | 0.40 |
| $C_3H_6$ Recycle Compressor | 0.95 | 1.30 | | 0.22 |
| Stabilizer Feed Compressor | | | 0.92 | |
| Stabilizer Tower | | | 0.44 | 0.57 |
| Recycle Heater | 0.10 | 0.14 | 0.13 | 0.28 |
| Finishing | 0.57 | 0.53 | 0.51 | 0.51 |
| Total | 4.01 | 3.98 | 3.35 | 3.28 |

Having described this invention, what is sought to be protected by Letters Patent is succinctly set forth in the following claims.

What is claimed is:

1. In the extract stripping process for producing diisopropyl ether wherein a sulfuric acid extract of propylene is heated in an ether generation zone to a temperature in the range of 90° to 120° C., to distill ether therefrom and wherein there is normally a large amount of propylene regenerated and distilled during said heating, the improvement which comprises maintaining said ether generation zone at a pressure in the range of 45 to 250 p. s. i. g. while stripping said acid extract therein with heated recycled propylene gas, said propylene gas being heated to a high temperature such that said acid extract is primarily heated thereby, whereby propylene regeneration is substantially suppressed and increased ether yields and selectivities are obtained.

2. The process of claim 1 wherein propyl alcohol, also distilled with said ether, is recovered, reheated and recycled to said ether generation zone.

3. A process for producing diisopropyl ether which comprises the steps of absorbing propylene in sulfuric acid to obtain an acid extract having an acid strength in the range of 60 to 70 wt. percent, and 0.8 to 1.6 moles propylene/mole 100% $H_2SO_4$, heating said acid extract in an ether generation zone to a generation temperature in the range of 90° to 120° C., under a pressure in the range of 45 to 250 p. s. i. g. while stripping with recycled reheated propylene gas containing over 90 mole percent propylene in an amount in the range of 5 to 20 moles/mole ether distilled, to recover from said acid extract vaporous propylene hydration products including diisopropyl ether, isopropyl alcohol, and propylene, separating and recovering said hydration products, reheating the propylene so recovered to a temperature in the range of 100° to 275° C., and recycling the propylene so reheated to said ether generation zone to maintain said generation temperature.

References Cited in the file of this patent

UNITED STATES PATENTS

| | | |
|---|---|---|
| 2,077,042 | Francis | Apr. 13, 1937 |
| 2,109,004 | Archibald et al. | Feb. 22, 1938 |
| 2,178,186 | Oldershaw | Oct. 31, 1939 |
| 2,609,400 | Amick | Sept. 2, 1952 |

FOREIGN PATENTS

| | | |
|---|---|---|
| 535,111 | Great Britain | Mar. 28, 1941 |